(12) United States Patent
Bang (10) Patent No.: US 12,556,025 B2
(45) Date of Patent: Feb. 17, 2026

(54) UNINTERRUPTIBLE POWER SUPPLY AND OPERATION METHOD THEREOF

(71) Applicant: LG ENERGY SOLUTION, LTD., Seoul (KR)

(72) Inventor: Junyoung Bang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/661,274

(22) Filed: May 10, 2024

(65) Prior Publication Data

US 2024/0388123 A1    Nov. 21, 2024

(30) Foreign Application Priority Data

May 15, 2023 (KR) .................. 10-2023-0062296
Apr. 19, 2024 (KR) .................. 10-2024-0052990

(51) Int. Cl.
*H02J 9/06* (2006.01)

(52) U.S. Cl.
CPC .............. *H02J 9/06* (2013.01); *H02J 9/061* (2013.01); *H02J 9/062* (2013.01)

(58) Field of Classification Search
CPC .............. H02J 9/06; H02J 9/061; H02J 9/062
USPC .............. 307/66, 87, 83; 700/297; 323/344; 363/126
See application file for complete search history.

(56) References Cited

U.S. PATENT DOCUMENTS

| | | |
|---|---|---|
| 2011/0133559 A1 | 6/2011 | Yamashita et al. |
| 2015/0171666 A1* | 6/2015 | Yeon ............ H02J 9/061 700/297 |
| 2016/0094086 A1 | 3/2016 | Lee et al. |
| 2016/0190864 A1 | 6/2016 | Yeon et al. |
| 2020/0235604 A1 | 7/2020 | Lee |
| 2023/0216334 A1* | 7/2023 | Konda ............ H02J 7/0049 307/66 |

FOREIGN PATENT DOCUMENTS

| | | |
|---|---|---|
| JP | 2016-163502 A | 9/2016 |
| JP | 6890285 B2 | 6/2021 |
| JP | 7264303 B1 | 4/2023 |
| JP | 7268515 B2 | 5/2023 |
| KR | 10-0208060 B1 | 7/1999 |
| KR | 20-2014-0003317 U | 6/2014 |

(Continued)

*Primary Examiner* — Arnold M Kinkead
(74) *Attorney, Agent, or Firm* — Birch, Stewart, Kolasch & Birch, LLP (57) ABSTRACT

An uninterruptible power supply includes: a battery; an insertion node configured to, when the uninterruptible power supply is coupled to a connection apparatus connected to a first main power line and a second main power line, be electrically connected to the first main power line in the connection apparatus; a power switch configured to connect the connection apparatus and the battery; and a battery management system configured to measure a first voltage of the first main power line through the connection apparatus, turn ON the power switch when the measured first voltage is lower than a predetermined threshold value, measure a second voltage of the insertion node in the ON state of the power switch, and turn OFF the power switch when the measured second voltage is lower than a reference voltage.

14 Claims, 7 Drawing Sheets

(56) References Cited

FOREIGN PATENT DOCUMENTS

| KR | 10-1455148 B1 | 10/2014 |
|----|---------------|---------|
| KR | 10-1607121 B1 | 3/2016 |
| KR | 10-1671591 B1 | 11/2016 |
| KR | 10-2019-0084506 A | 7/2019 |
| KR | 10-2162246 B1 | 10/2020 |

* cited by examiner

UNINTERRUPTIBLE POWER SUPPLY AND OPERATION METHOD THEREOF

CROSS-REFERENCE TO RELATED APPLICATIONS

This application is based on and claims priority from Korean Patent Application No. 10-2023-0062296 filed on May 15, 2023, and Korean Patent Application No. 10-2024-0052990 filed on Apr. 19, 2024, with the Korean Intellectual Property Office, the disclosures of which are incorporated herein in their entireties by reference.

TECHNICAL FIELD

The present disclosure relates to an uninterruptible power supply and an operation method thereof.

BACKGROUND

An uninterruptible power supply (UPS) supplies electric power to a power line during a power line outage. However, the uninterruptible power supply may equally operate as in the power line outage even when the uninterruptible power supply is disconnected from the power line. When the uninterruptible power supply is disconnected from the power line, the uninterruptible power supply may recognize the disconnection status as the power outage, and continue to supply the electric power, without stopping its operation.

SUMMARY

The present disclosure provides an uninterruptible power supply capable of discriminating between a power line outage and a disconnection from the power line, and an operation method thereof.

According to an embodiment of the present disclosure, an uninterruptible power supply includes: a battery; an insertion node configured to, when the uninterruptible power supply is coupled to a connection apparatus connected to a first main power line and a second main power line, be electrically connected to the first main power line in the connection apparatus; a power switch configured to connect the connection apparatus and the battery; and a battery management system configured to measure a first voltage of the first main power line through the connection apparatus, turn ON the power switch when the measured first voltage is lower than a predetermined threshold value, measure a second voltage of the insertion node in the ON state of the power switch, and turn OFF the power switch when the measured second voltage is lower than a reference voltage.

At a predetermined monitoring interval, the battery management system may measure the first voltage, compare the measured first voltage with the threshold value, determine that a power is being supplied through the first main power line and the second main power line, when the measured first voltage is equal to or higher than the threshold value, and control the power switch to turn OFF.

The battery management system may turn ON the power switch when the measured first voltage is lower than the threshold value, measure the second voltage in the ON state of the power switch, turn OFF the power switch when the measured second voltage is lower than the reference voltage, and maintain the ON state of the power switch when the measured second voltage is equal to or higher than the reference voltage.

When the measured second voltage is lower than the reference voltage, the battery management system may turn OFF the power switch, and then, be turned OFF.

The battery management system may maintain the ON state of the power switch when the measured second voltage is equal to or higher than the reference voltage.

The connection apparatus may include: a first connection terminal connected to the first main power line; a first wire between the first main power line and the first connection terminal; a second connection terminal electrically connected to the insertion node when the uninterruptible power supply and the connection apparatus are coupled.

The battery management system may turn OFF the power switch when the measured second voltage is lower than the reference voltage in the ON state of the power switch.

According to another embodiment of the present disclosure, a method for operating an uninterruptible power supply includes: providing the uninterruptible power supply to be electrically connected to a connection apparatus connected to a first main power line and a second main power line; detecting a power OFF status where no power is supplied to the first main power line and the second main power line; when the power OFF status is detected, turning ON a power switch to connect a battery of the uninterruptible power supply to the connection apparatus; after turning ON the power switch, measuring a first voltage of the first main power line through an insertion node provided to be connected to the first main power line; when the measured first voltage is lower than a predetermined reference value, determining that the uninterruptible power supply and the connection apparatus are in a disconnection status; and turning OFF the power switch in the determined disconnection status.

The method above may further include: when the measured first voltage is equal to or more than the predetermined reference value, determining that a power outage status occurs; and maintaining the ON state of the power switch in the determined power outage status.

The method above may further include: in the determined disconnection status, turning OFF the power switch, and then, turning OFF the uninterruptible power supply.

According to another embodiment of the present disclosure, a non-transitory computer-readable storage medium having stored therein a program that implements a method for operating an uninterruptible power supply by executing a process includes steps of providing the uninterruptible power supply to be electrically connected to a connection apparatus connected to a first main power line and a second main power line; detecting a power OFF status where no power is supplied to the first main power line and the second main power line; when the power OFF status is detected, turning ON a power switch to connect a battery of the uninterruptible power supply to the connection apparatus; after turning ON the power switch, measuring a first voltage of the first main power line through an insertion node provided to be connected to the first main power line; when the measured first voltage is lower than a predetermined reference value, determining that the uninterruptible power supply and the connection apparatus are in a disconnection status; and turning OFF the power switch in the determined disconnection status.

The non-transitory computer-readable storage medium further includes a step of, in the determined disconnection status, turning OFF the power switch, and then, turning OFF the uninterruptible power supply.

The non-transitory computer-readable storage medium further includes a steps of, when the measured first voltage is equal to or more than the predetermined reference value, determining that a power outage status occurs; and maintaining the ON state of the power switch in the determined power outage status.

The present disclosure provides an uninterruptible power supply capable of discriminating between a power line outage and a disconnection from the power line, and an operation method thereof.

Corresponding reference characters indicate corresponding components throughout the several views of the drawings. Skilled artisans will appreciate that elements in the FIGURES are illustrated for simplicity and clarity and have not necessarily been drawn to scale. For example, the dimensions of some of the elements in the figures may be exaggerated relative to other elements to help to improve understanding of various embodiments. Also, common but well-understood elements that are useful or necessary in a commercially feasible embodiment are often not depicted in order to facilitate a less obstructed view of these various embodiments.

DETAILED DESCRIPTION

In the following detailed description, reference is made to the accompanying drawings which form a part hereof. The illustrative embodiments described in the detailed description, drawings, and claims are not meant to be limiting. Other embodiments may be utilized, and other changes may be made without departing from the spirit or scope of the subject matter presented herein.

When describing embodiments of the present disclosure, detailed description of related known art may be omitted if determined to obscure the gist of the embodiments. Further, the accompanying drawings are intended merely to facilitate the understanding of embodiments described herein without limiting the technical idea of the present disclosure, and should be construed as encompassing all modifications, equivalents, and substitutes included in the technical gist and scope of the present disclosure.

Terms with ordinal numbers such as first, second and so on may be used to describe various components, but should not be interpreted as limiting the components. The terms are used solely for the purpose of discriminating a component from others.

When two components are "coupled" or "connected" to each other, this description should be understood to indicate not only that the two components are directly coupled or connected to each other, but also that another component may be present between the two components. Meanwhile, when two components are "directly coupled" or "directly connected" to each other, this description should be understood to indicate that another component is not present between the two components.

In the descriptions herein below, terms such as "include" and "have" are intended to designate the presence of features, numerals, steps, operations, components, parts, and combinations thereof described herein, but should not be interpreted to exclude the presence or possible addition of one or more other features, numerals, steps, operations, components, parts, and combinations thereof.

Figure 1:
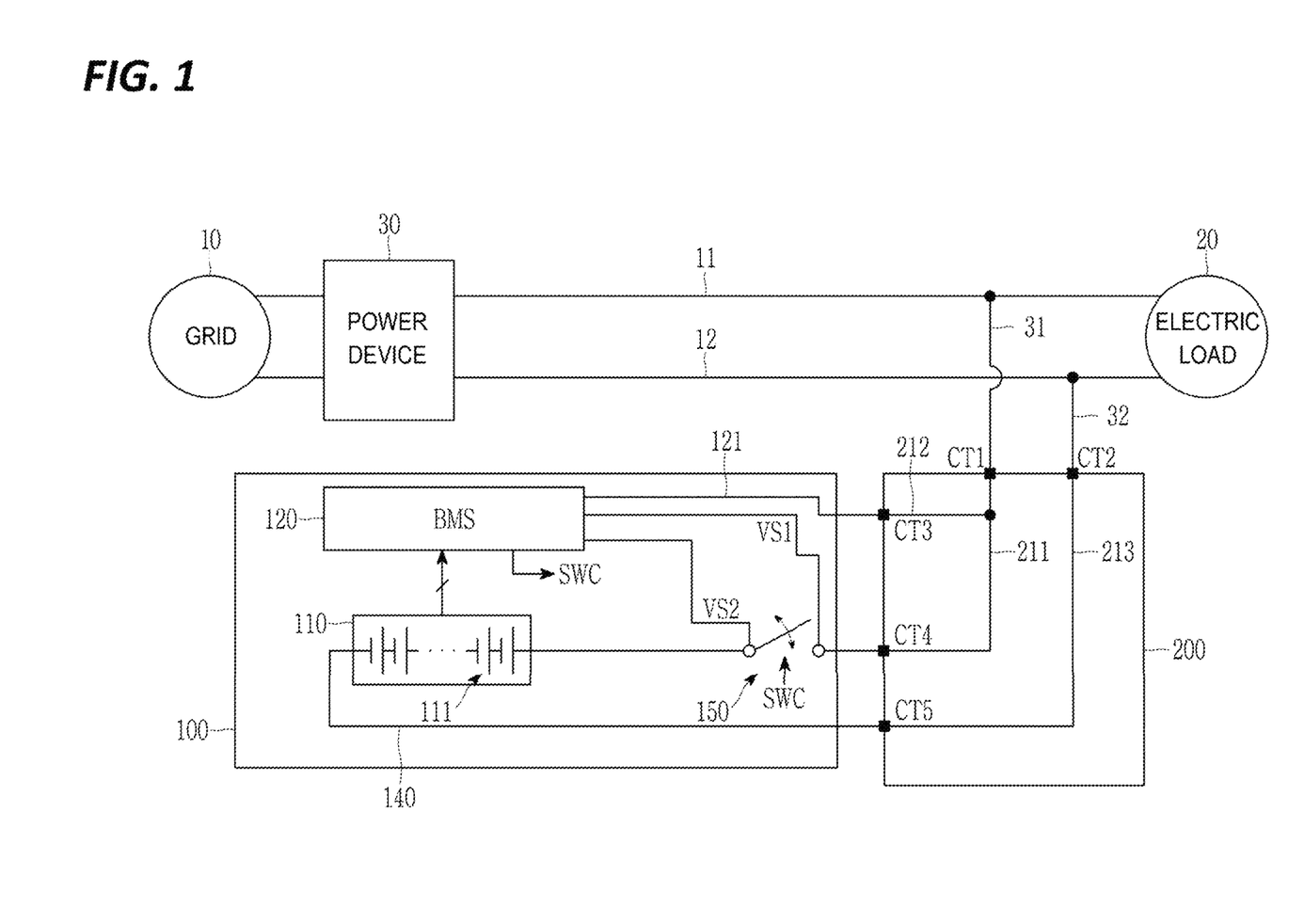
FIG. 1 is a view illustrating a power system to which an uninterruptible power supply is applied according to an embodiment of the present disclosure.

FIG. 1 is a view illustrating a power system to which an uninterruptible power supply according to an embodiment of the present disclosure is applied.

As illustrated in FIG. 1, two main power lines 11 and 12 are connected between a grid 10 and an electric load 20. A power device 30 may supply a power supplied from the grid 10 to the electric load 20 through the two main power lines 11 and 12 after filtering, switching, or converting the power.

An uninterruptible power supply 100 may be connected to the two main power lines 11 and 12 via a connection device 200. The uninterruptible power supply 100 may operate as a power source, or be charged by the power device 30. When the power from the grid 10 is not supplied to the two main power lines 11 and 12 due to an occurrence of an abnormal status such as a power outage, the power supplied from the uninterruptible power supply 100 may be supplied to the two main power lines 11 and 12. Or, the uninterruptible power supply 100 may be charged with the power supplied from the power device 30 through the two main power lines 11 and 12 and the connection device 200.

The connection device 200 may implement the connection between the two main power lines 11 and 12 and the uninterruptible power supply 100. The connection device 200 may include wires and various circuit elements to implement the electrical connection between the two main power lines 11 and 12 and the uninterruptible power supply 100. In FIG. 1, the connection device 200 includes five connection terminals CT1 to CT5 for the connection with external components. The five connection terminals CT1 to CT5 illustrated in FIG. 1 are examples for describing an embodiment, and the present disclosure is not limited thereto. The connection terminal CT1 and the main power line 11 may be connected via a wire 31, and the connection terminals CT1 and CT4 may be connected via a wire 211. The connection terminal CT3 and the wire 211 may be connected via a wire 212. The connection terminal CT2 and the main power line 12 may be connected via a wire 32. The connection terminal CT4 may be connected to one end of a power switch 150 of the uninterruptible power supply 100, and the connection terminals CT2 and CT5 may be connected via a wire 213. The connection terminal CT5 may be connected to the anode (negative electrode) of a battery device 110 of the uninterruptible power supply 100. The anode of the battery device 110 may be the anode with the lowest electric potential among the anodes of a plurality of battery cells included in the battery device 110. While FIG. 1 illustrates the state where the connection terminal CT3 is connected to the wire 211 via the wire 212, the present disclosure is not limited thereto. For example, the connection terminals CT1 and CT3 may be the same terminal. Alternatively, the connection terminal CT3 may be connected directly to the connection terminal CT1 via the wire 212. The connection terminal CT3 is a terminal for detecting the connection between the uninterruptible power supply 100 and the main power line 11, and may be implemented in various forms.

The uninterruptible power supply 100 may include an insertion node 121 that comes into contact with the connection terminal CT3 when the uninterruptible power supply 100 is coupled to the connection device 200. One end of the insertion node 121 is connected to a battery management system (BMS) 120 of the uninterruptible power supply 100, and when the uninterruptible power supply 100 is coupled to the connection device 200, the other end of the insertion node 121 may come into contact with the connection terminal CT3. The contact may be implemented as a physical coupling. In this way, the insertion node 121 may be electrically connected to the main power line 11 by being electrically connected to the connection terminal CT3. When the uninterruptible power supply 100 is disconnected from the connection device 200, the other end of the insertion node 121 may no longer be in contact with the connection terminal CT3 and may become in a floating state.

As described above, the uninterruptible power supply 100 may further include the battery device 110, the battery management system 120, and the power switch 150. The battery device 110 may include a plurality of battery cells 111. While FIG. 1 illustrates the plurality of battery cells 111 connected in series, the present disclosure is not limited thereto. For example, the connection among the plurality of battery cells 111 may be implemented in various ways including the in-series connection, the parallel connection, and a combination thereof. The other end of the power switch 150 may be connected to the cathode (positive electrode) of a battery cell with the highest electric potential among the plurality of battery cells 111. The uninterruptible power supply 100 may supply the power in the ON state of the power switch 150.

The battery management system 120 may be connected to the battery device 110 to monitor the battery device 110, and control a charging, a discharging, and other protection operations. The battery management system 120 may perform various operations necessary to manage the battery device 110, including, for example, measuring the cell voltage of each of the plurality of battery cells 111, measuring the current flowing in the battery device 110, measuring the temperature of the battery device 110, and estimating the SOC (State of Charge) and SOH (State of Health) of the battery device 110.

The battery management system 120 may generate a switching signal SWC for controlling the switching operation of the power switch 150 connected between the uninterruptible power supply 100 and the connection device 200. One end of the power switch 150 is connected to the connection terminal CT4 of the connection device 200.

The battery management system 120 may detect the voltage of the main power line 11. To this end, the battery management system 120 may measure a voltage VS1 at one end of the power switch 150 electrically connected to the connection terminal CT4. When the voltage at one end of the power switch 150 electrically connected to the connection terminal CT4 is equal to or higher than a predetermined value, the battery management system 120 may determine that a voltage is being supplied to the connection device 200, and when the voltage at one end of the power switch 150 is lower than the predetermined value, the battery management system 120 may determine that no voltage is being supplied to the connection device 200. When no voltage is supplied to the connection device 200, the battery management system 120 may turn ON the power switch 150 to determine which of a power outage status and a disconnection status occurs, and detect the voltage of the main power line 11 through the insertion node 121. Simultaneously, the battery management system 120 may also measure a voltage VS2 at the other end of the power switch 150. When the difference between the voltages VS1 and VS2 is equal to or higher than a predetermined value, the battery management system 120 may determine that a voltage is being supplied to the connected device 200, and when the difference is lower than the predetermined value, the battery management system 120 may determine that no voltage is being supplied to the connection device 200.

The power outage status may indicate a status where the power supply from the grid 10 is cut off, and the disconnection status may indicate a status where the uninterruptible power supply 100 is disconnected or separated from the connection device 200. In the power outage status, the uninterruptible power supply 100 is connected to the connection device 200, but may not detect the voltage of the main power line 11 through the connection device 200 because no voltage is supplied from the main power line 11 to the connection device 200. In the disconnection status, the uninterruptible power supply 100 may not detect the voltage of the main power line 11 through the connection device 200 because the uninterruptible power supply 100 is disconnected from the connection device 200. That is, in both the disconnection status and the power outage status, the uninterruptible power supply 100 may not detect the voltage of the main power line 11. In order to determine the operation mode of the uninterruptible power supply 100, it is necessary to determine which of the disconnection status and the power outage status occurs. The battery management system 120 according to an embodiment may measure the voltage of the main power line 11 through the insertion node 121, and determine which of the power outage status or the disconnection status occurs, based on the measured voltage. When the voltage of the main power line 11 is not detected through the connection device 200, the battery management system 120 may turn ON the power switch 150, and when the voltage of the main power line 11 is detected through the insertion node 121 during the ON period of the power switch 150, the battery management system 120 may determine that the power outage status occurs. When the voltage of the main power line 11 is not detected through the insertion node 121 during the ON period of the power switch 150, the battery management system 120 may determine that the disconnection status occurs.

The operation mode of the uninterruptible power supply 100 may include an idle mode, a power supply mode, and a disconnection mode.

The idle mode of the uninterruptible power supply 100 refers to an operation mode when the power of the grid 10 is supplied to the electric load 20 through the power device 30 and the two main power lines 11 and 12 in a state where the uninterruptible power supply 100 is able to supply a power (hereinafter, referred to as the "ON state"). In the idle mode, the uninterruptible power supply 100 may detect the voltage of at least one of the two main power lines 11 and 12 through the connection device 200 at predetermined monitoring intervals (e.g., several ms). For example, the battery management system 120 may detect the voltage of the main power line 11 based on the voltage at one end of the power switch 150 (the end connected to the connection terminal CT4) or the difference between the voltages at both ends of the power switch 150. The main power line 11 is electrically connected to the connection terminal CT4 via the connection device 200, and when the power of the grid 10 is supplied to the electric load 20 through the power device 30 and the two main power lines 11 and 12, a voltage may occur in the main power line 11. In this way, in the idle mode, the battery management system 120 may monitor whether the power is supplied through the two main power lines 11 and 12, thereby detecting the power outage or the disconnection.

The power supply mode may refer to an operation mode in which the uninterruptible power supply 100 supplies a power. In the power supply mode, the power switch 150 is in the ON state. When it is detected in the idle mode that no power is supplied through the two main power lines 11 and 12, the battery management system 120 may turn ON the power switch 150. After the power switch 150 is turned ON, the battery management system 120 may determine which of the power outage status and the disconnection status occurs. When the battery management system 120 determines that the power outage status occurs, the power switch 150 remains in the ON state. In the ON state of the power switch 150, the connection device 200 may supply the power from the uninterruptible power supply 100 to the electric load 20 through the two main power lines 11 and 12. In this way, the power supply mode is the mode in which the uninterruptible power supply 100 operates as a power source during the ON period of the power switch 150.

When the battery management system 120 determines that the disconnection status occurs, the battery management system 120 may turn OFF the power switch 150. The disconnection mode may be the operation mode of the uninterruptible power supply 100 in a state of being separated from the connection device 200. In the disconnection mode, the battery management system 120 is turned OFF, and the uninterruptible power supply 100 may also stop its operation, i.e., be turned OFF.

Figure 2:
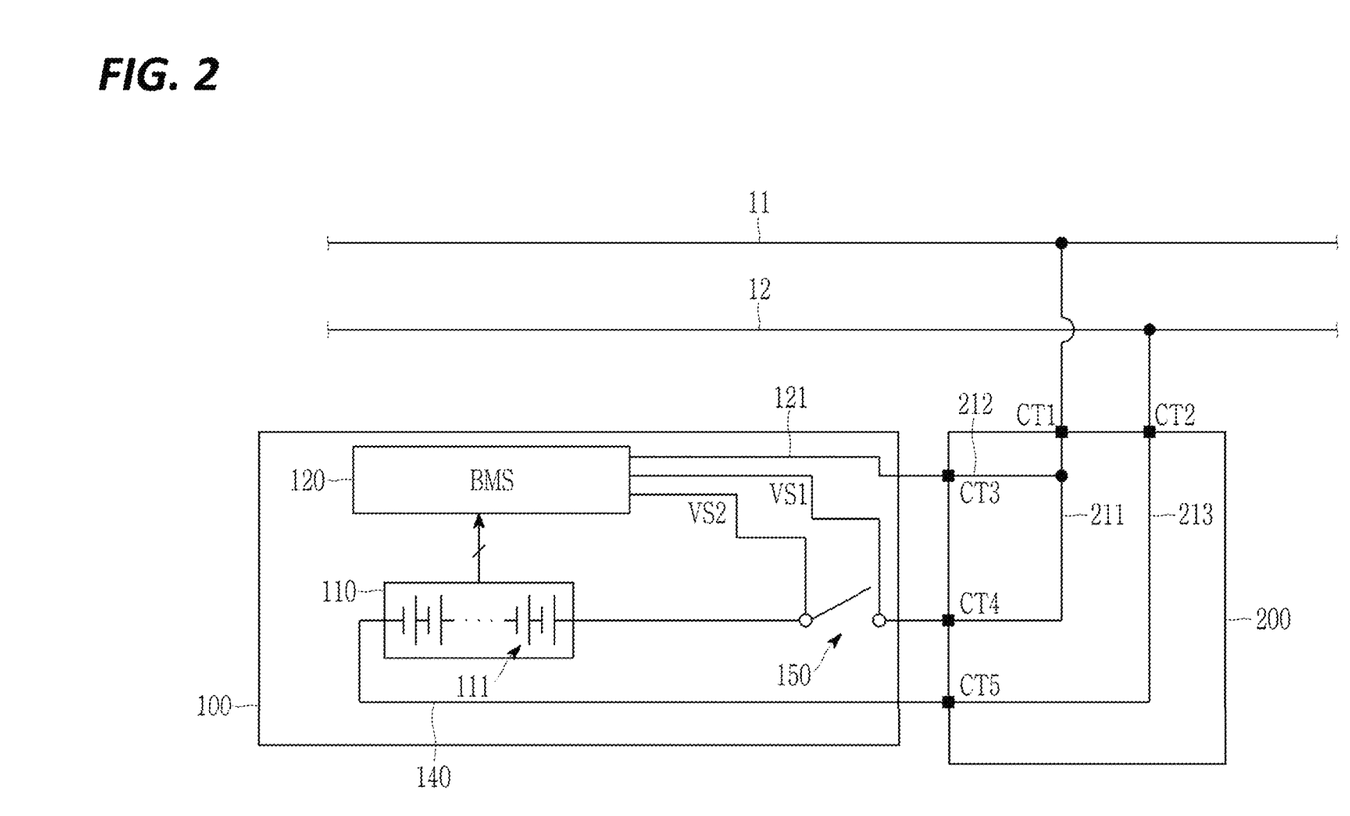
FIG. 2 is a block diagram illustrating the uninterruptible power supply and a connection device in an idle mode.

FIG. 2 is a block diagram illustrating the uninterruptible power supply and the connection device in the idle mode.

As illustrated in FIG. 2, the power switch 150 is in the OFF state during the idle mode. The anode of the battery device 110 is connected to the connection terminal CT5 of the connection device 200 via the wire 140, and the insertion node 121 is connected to the connection terminal CT3 of the connection device 200. The battery management system 120 may measure the voltage of the main power line 11 through the connection device 200 at the monitoring intervals. The battery management system 120 may measure the voltage VS1 or both the voltages VS1 and VS2, and when the voltage of the main power line 11 is equal to or higher than a predetermined threshold value, the battery management system 120 may determine that neither the power outage status nor the disconnection status occurs, and remain in the idle mode. When the measured voltage of the main power line 11 is lower than the predetermined threshold value, the battery management system 120 may perform a status identification operation to determine which of the power outage status and the disconnection status occurs.

Figure 3:
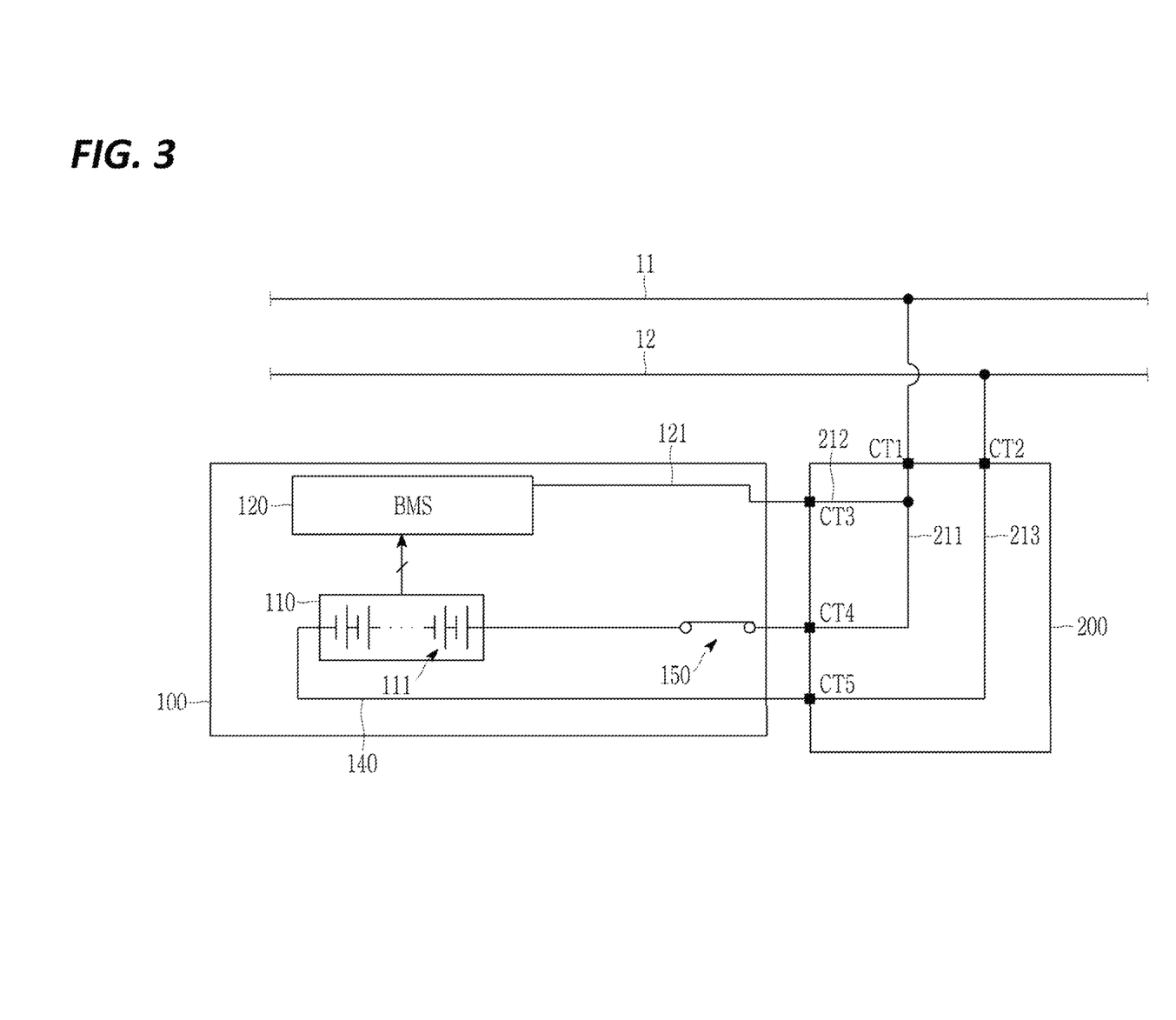
FIG. 3 is a block diagram illustrating the uninterruptible power supply and the connection device in a power supply mode.

FIG. 3 is a block diagram illustrating the uninterruptible power supply and the connection device in the power supply mode.

As a result of the status identification operation, when the power outage status occurs, the uninterruptible power supply 100 may operate in the power supply mode. In the power supply mode, the power switch 150 is in the ON state. The cathode of the battery device 110 is electrically connected to the main power line 11, and the anode of the battery unit 110 is electrically connected to the main power line 12, so that the power of the battery device 110 may be supplied to the two main power lines 11 and 12.

Figure 4:
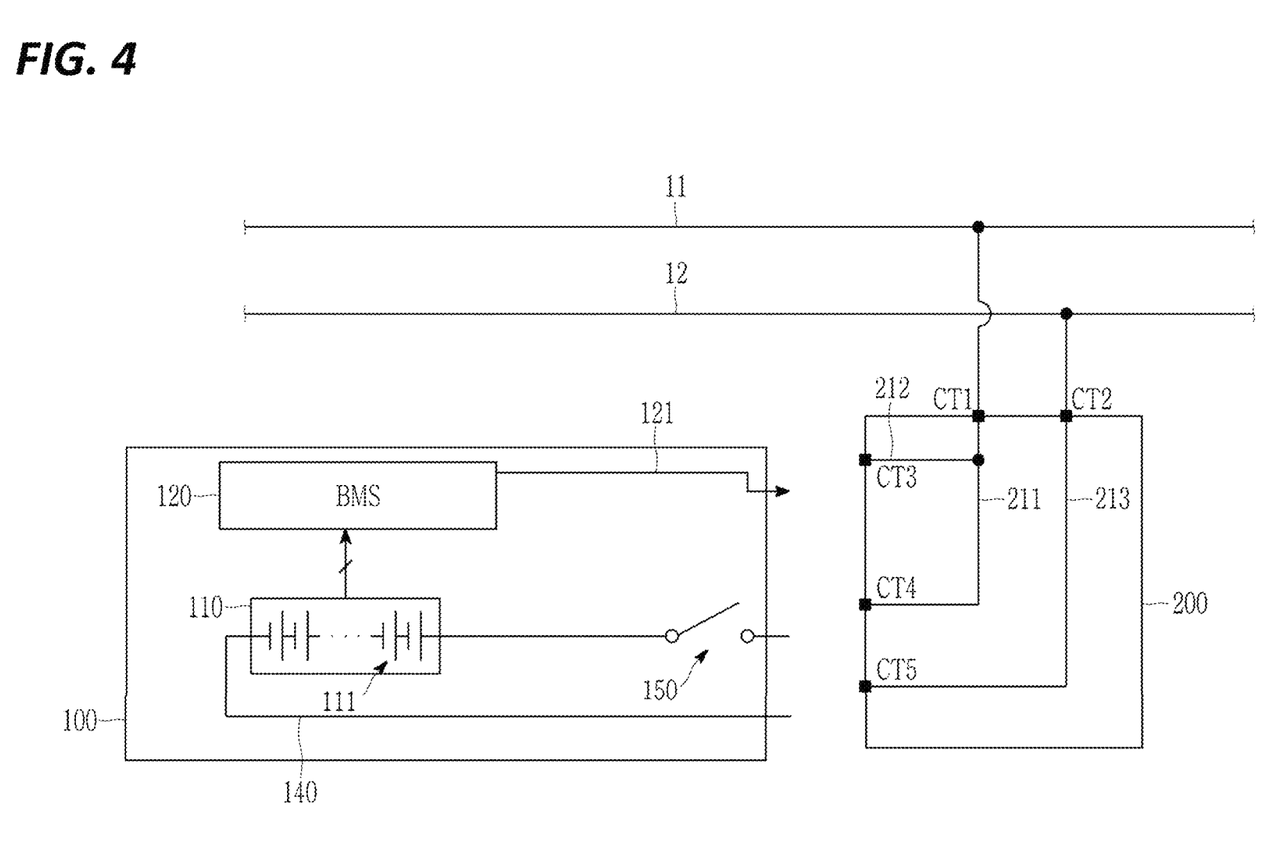
FIG. 4 is a block diagram illustrating the uninterruptible power supply and the connection device in a disconnection mode.

FIG. 4 is a block diagram illustrating the uninterruptible power supply and the connection device in the disconnection mode.

As a result of the status identification operation, when the disconnection status occurs, the uninterruptible power supply 100 may operate in the disconnection mode. In the disconnection mode, the battery management system 120 may turn OFF the power switch 150, and may be turned OFF.

Figure 5:
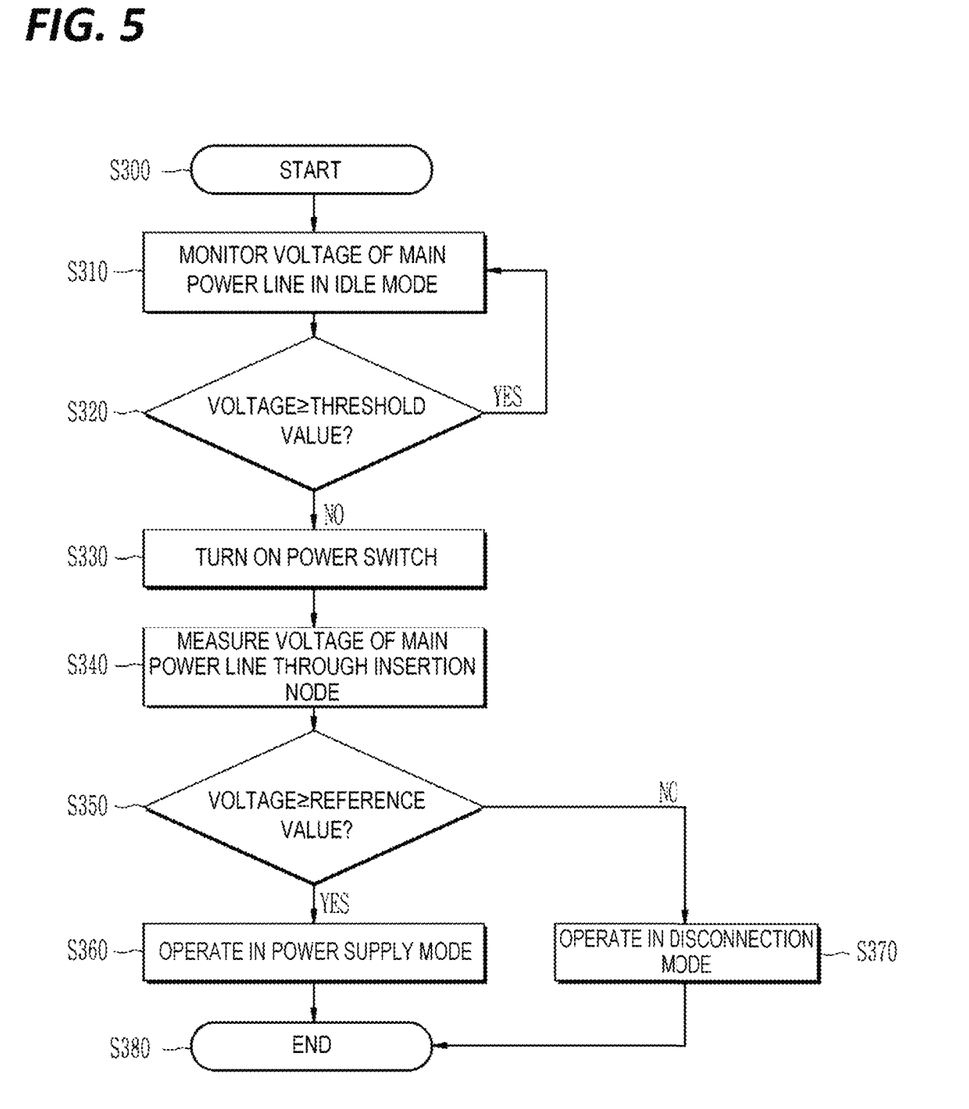
FIG. 5 is a flowchart illustrating an operation of the uninterruptible power supply according to an embodiment.

FIG. 5 is a flowchart illustrating the operation of the uninterruptible power supply according to an embodiment.

First, in S310, the battery management system 120 may monitor the voltage of the main power lines 11 and 12 through the connection device 200 in the idle mode. In S320, the battery management system 120 may determine whether the monitored voltage is equal to or higher than the threshold value. When it is determined in S320 that the monitored voltage is equal to or higher than the threshold value (S320, YES), the battery management system 120 may return to S310 to monitor the voltage of the main power lines 11 and 12 in the idle mode.

Meanwhile, when it is determined in S320 that the monitored voltage is lower than the threshold value (S320, NO), for example, when no voltage is detected in the main power lines 11 and 12, the battery management system 120 may turn ON the power switch 150 to identify the power outage status or the disconnection status.

Then, in S340, the battery management system 120 may measure the voltage of the main power lines 11 and 12 through the insertion node 121. Subsequently, in S350, the battery management system 120 may determine whether the measured voltage is equal to or higher than a predetermined reference value.

When it is determined in S350 that the measured voltage is equal to or higher than the predetermined reference value (S350, YES), the battery management system 120 may operate in the power supply mode in S360, and supply the power to the main power lines 11 and 12 while continuing to maintain the ON state of the power switch 150 as described above.

Meanwhile, when it is determined in S350 that the measured voltage is lower than the predetermined reference value (S350, NO), the battery management system 120 may operate in the disconnection mode, and stop the power supply to the main power lines 11 and 12 by turning OFF the power switch 150 as described above. In the disconnection mode, the uninterruptible power supply 100 may also be turned OFF, simultaneously with the OFF of the battery management system 120.

Figure 6:
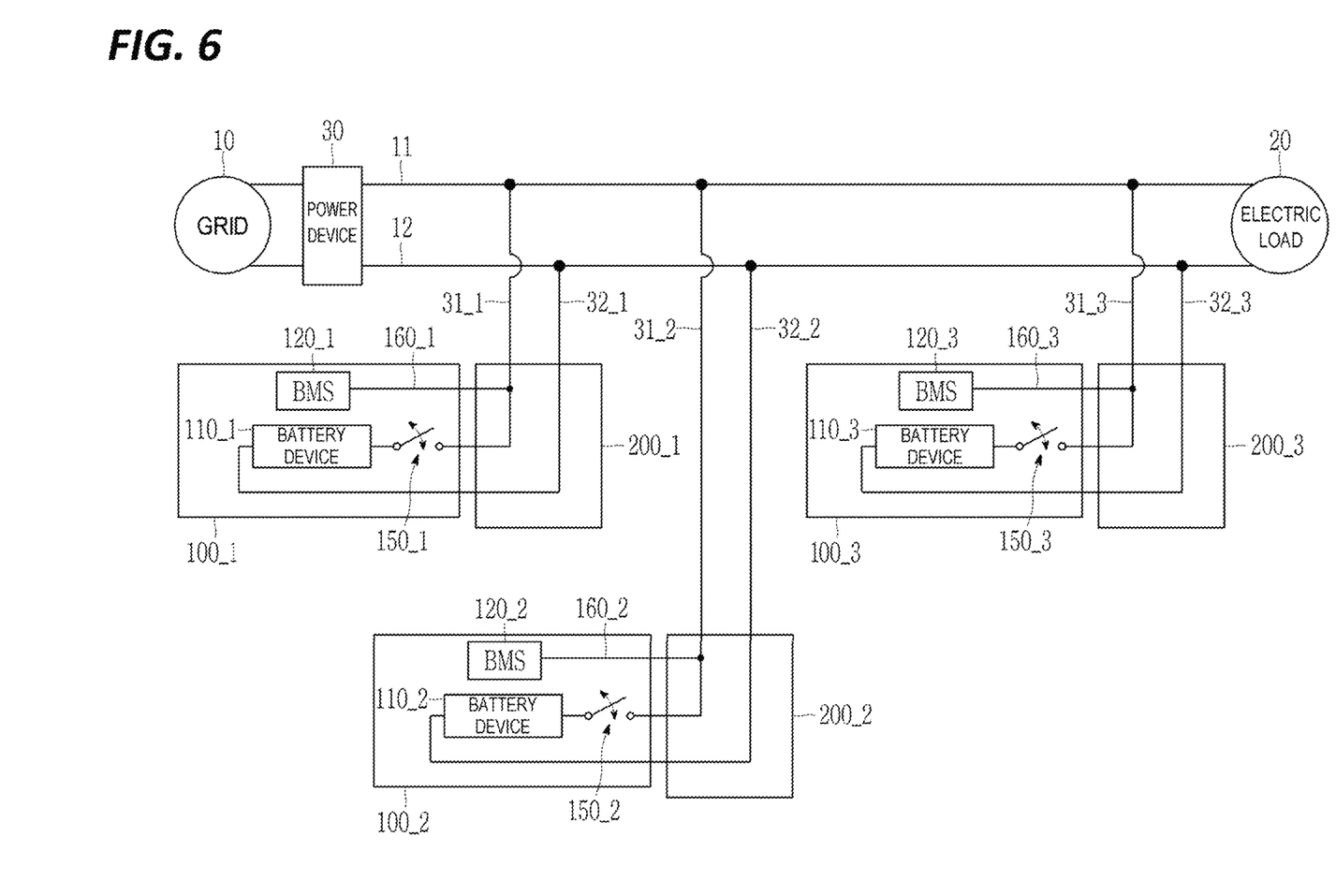
FIG. 6 is a block diagram illustrating a plurality of uninterruptible power supplies connected to main power lines according to another embodiment.

In another embodiment, a plurality of uninterruptible power supplies may be connected to the two main power lines 11 and 12.

FIG. 6 is a block diagram illustrating the plurality of uninterruptible power supplies connected to the main power lines according to another embodiment.

While FIG. 6 illustrates three uninterruptible power supplies connected to the two main power lines 11 and 12, the present disclosure is not limited thereto.

The configuration of each of three connection devices 200_1, 200_2, and 200_3 and three uninterruptible power supplies 100_1, 100_2, and 100_3 may be the same as that illustrated in FIG. 1. Hereinafter, the embodiment illustrated in FIG. 6 will be described omitting the same descriptions as those described above.

The three uninterruptible power supplies 100_1, 100_2, and 100_3 may include battery devices 110_1, 110_2, and 110_3, battery management systems 110_1, 110_2, and 110_3, power switches 150_1, 150_2, and 150_3, and insertion nodes 160_1, 160_2, and 160_3, respectively.

The connection device 200_1 may be connected to the two main power lines 11 and 12 via two wires 31_1 and 32_1, the connection device 200_2 may be connected to the two main power lines 11 and 12 via two wires 31_2 and 32_2, and the connection device 200_3 may be connected to the two main power lines 11 and 12 via two wires 31_3 and 32_3.

The battery management systems 120_1, 120_2, and 120_3 of the three uninterruptible power supplies 100_1, 100_2, and 100_3 may measure the voltage of the main power line 11 at the monitoring intervals in the ON state of the uninterruptible power supplies 100_1, 100_2, and 100_3, and operate according to the idle mode when the measured voltage is equal to or higher than the threshold value. The three battery management systems 110_1, 110_2, and 110_3 may individually perform the monitoring operation.

As a result of the monitoring, when the measured voltage of the main power line 11 is lower than the threshold value, the battery management systems 110_1, 110_2, and 110_3 may turn ON the power switches 150_1, 150_2, and 150_3, measure the voltage of the main power line 11 through the insertion nodes 160_1, 160_2, and 160_3, determine that the power outage status occurs when the measured voltage is equal to or higher than the reference voltage, and determine that the disconnection status occurs when the measured voltage is lower than the reference voltage. Each of the three battery management systems 120_1, 120_2, and 120_3 may individually perform the status determination operation.

The three battery management systems 120_1, 120_2, and 120_3 may individually operate according to the power supply mode when the power outage status occurs, and operate according to the disconnection mode when the disconnection status occurs.

Figure 7:
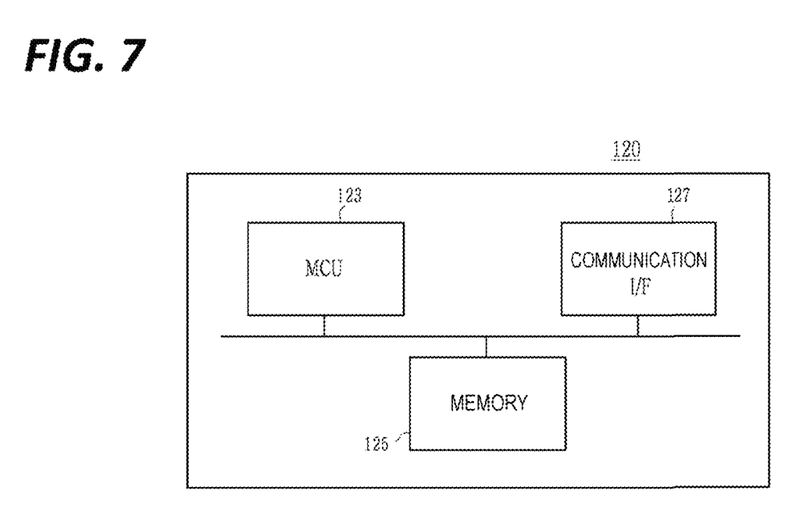
FIG. 7 is a block diagram illustrating a hardware configuration for implementing a battery management system included in the uninterruptible power supply according to an embodiment.

FIG. 7 is a block diagram illustrating a hardware configuration of the battery management system 120 included in the uninterruptible power supply 100 according to an embodiment.

The battery management system 120 according to an embodiment of the present disclosure may include an MCU 123, a memory 125, and a communication I/F 127. The MCU 123 may refer to a micro control unit, and be a processor that executes various programs stored in the memory 125, processes various data used for the programs, and executes the functions of the battery management system 120.

The memory 125 may store various programs and data related to the operation of the battery management system 120 for implementing the operation of the uninterruptible power supply 100. As needed, a plurality of memories 125 may be provided. The memory 125 may be a volatile or nonvolatile memory. As for the volatile memory, the memory 125 may be, for example, a RAM, a DRAM, or an SRAM. As for the nonvolatile memory, the memory 125 may be, for example, a ROM, a PROM, an EAROM, an EPROM, an EEPROM, or a flash memory. The examples of the memory 125 are merely examples, and may not be limited thereto.

The communication I/F 127 is configured to transmit and receive various data to/from a server, and may be any of various devices capable of supporting a wired or wireless communication. For example, through the communication I/F 127, various programs or data for implementing the operation of the uninterruptible power supply 100 may be transmitted and received to/from a separate external server through either a wired communication or a wireless communication.

As described above, the uninterruptible power supply according to the present disclosure may identify the power outage status and the disconnection status without needing a separate device, which may not cause unnecessary operations. Since the conventional uninterruptible power supply remains in the ON state even under the disconnection status, the battery management system needs to perform the protection operation to detect an abnormality such as the short circuit in a battery device, and the operation of the battery management system may consume the power. The uninterruptible power supply according to the present disclosure may eliminate such unnecessary operations, and consequently, prevent not only safety accidents caused from the abnormality of the battery device but also degradations in performance and lifespan of the battery device.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

LIST OF REFERENCE NUMERALS

10 . . . grid
11, 12 . . . main power line
20 . . . electric load
30 . . . power device
100 . . . uninterruptible power supply
110 . . . battery device
120 . . . battery management system
150 . . . power switch
121 . . . insertion node
200 . . . connection device

What is claimed is:

1. An uninterruptible power supply comprising:
a battery;
an insertion node configured to, when the uninterruptible power supply is coupled to a connection apparatus connected to a first main power line and a second main power line, be electrically connected to the first main power line in the connection apparatus;
a power switch having a first end connected to the connection apparatus and a second end connected to the battery, the power switch being configured to connect the connection apparatus and the battery based on a switching signal; and
a battery management system configured to measure a first voltage of the first main power line through the connection apparatus, turn ON the power switch when the measured first voltage is lower than a predetermined threshold value, measure a second voltage of the insertion node in the ON state of the power switch, and turn OFF the power switch when the measured second voltage is lower than a reference voltage,
wherein the insertion node includes a first end connected to the first main power line and a second end connected to the battery management system.

2. The uninterruptible power supply according to claim 1, wherein at a predetermined monitoring interval, the battery management system measures the first voltage, compares the measured first voltage with the threshold value, determines that a power is being supplied through the first main power line and the second main power line, when the measured first voltage is equal to or higher than the threshold value, and controls the power switch to turn OFF.

3. The uninterruptible power supply according to claim 2, wherein the battery management system turns ON the power switch when the measured first voltage is lower than the threshold value, measures the second voltage in the ON state of the power switch, turns OFF the power switch when the measured second voltage is lower than the reference voltage, and maintains the ON state of the power switch when the measured second voltage is equal to or higher than the reference voltage.

4. The uninterruptible power supply according to claim 2, wherein when the measured second voltage is lower than the reference voltage, the battery management system turns OFF the power switch, and then, is turned OFF.

5. The uninterruptible power supply according to claim 1, wherein the battery management system maintains the ON state of the power switch when the measured second voltage is equal to or higher than the reference voltage.

6. The uninterruptible power supply according to claim 1, wherein the connection apparatus includes:
   a first connection terminal connected to the first main power line;
   a first wire between the first main power line and the first connection terminal; and
   a second connection terminal electrically connected to the insertion node when the uninterruptible power supply and the connection apparatus are coupled.

7. The uninterruptible power supply according to claim 1, wherein the battery management system turns OFF the power switch when the measured second voltage is lower than the reference voltage in the ON state of the power switch.

8. A method for operating an uninterruptible power supply, the method comprising:
   providing the uninterruptible power supply to be electrically connected to a connection apparatus connected to a first main power line and a second main power line;
   detecting a power OFF status where no power is supplied to the first main power line and the second main power line;
   when the power OFF status is detected, turning ON a power switch to connect a battery of the uninterruptible power supply to the connection apparatus;
   after turning ON the power switch, measuring a first voltage of the first main power line through an insertion node provided to be connected to the first main power line;
   when the measured first voltage is lower than a predetermined reference value, determining that the uninterruptible power supply and the connection apparatus are in a disconnection status; and
   turning OFF the power switch in the determined disconnection status,
   wherein the power switch has a first end connected to the connection apparatus and a second end connected to the battery, and
   wherein the insertion node includes a first end connected to the first main power line and a second end connected to a battery management system of the uninterruptible power supply.

9. The method according to claim 8, further comprising:
   when the measured first voltage is equal to or more than the predetermined reference value, determining that a power outage status occurs; and
   maintaining the ON state of the power switch in the determined power outage status.

10. The method according to claim 8, further comprising:
    in the determined disconnection status, turning OFF the power switch, and then, turning OFF the uninterruptible power supply.

11. A non-transitory computer-readable storage medium having stored therein a program that, when executed by a processor, implements a method for operating an uninterruptible power supply by executing a process comprising:
    providing the uninterruptible power supply to be electrically connected to a connection apparatus connected to a first main power line and a second main power line;
    detecting a power OFF status where no power is supplied to the first main power line and the second main power line;
    when the power OFF status is detected, turning ON a power switch to connect a battery of the uninterruptible power supply to the connection apparatus;
    after turning ON the power switch, measuring a first voltage of the first main power line through an insertion node provided to be connected to the first main power line;
    when the measured first voltage is lower than a predetermined reference value, determining that the uninterruptible power supply and the connection apparatus are in a disconnection status; and
    turning OFF the power switch in the determined disconnection status,
    wherein the power switch has a first end connected to the connection apparatus and a second end connected to the battery, and
    wherein the insertion node includes a first end connected to the first main power line and a second end connected to a battery management system of the uninterruptible power supply.

12. The non-transitory computer-readable storage medium according to claim 11, the process further comprising:
    in the determined disconnection status, turning OFF the power switch, and then, turning OFF the uninterruptible power supply.

13. The non-transitory computer-readable storage medium according to claim 11, the process further comprising:
    when the measured first voltage is equal to or more than the predetermined reference value, determining that a power outage status occurs; and
    maintaining the ON state of the power switch in the determined power outage status.

14. The uninterruptible power supply according to claim 1, wherein
    when a voltage difference between the first and second ends of the power switch is equal to or higher than a predetermined value, the battery management system determines that a voltage is being supplied to the connected device, and
    when the voltage difference is lower than the predetermined value, the battery management system determines that no voltage is being supplied to the connection apparatus.

* * * * *